US012517418B2

(12) United States Patent
Song

(10) Patent No.: US 12,517,418 B2
(45) Date of Patent: Jan. 6, 2026

(54) CAMERA MODULE AND MOVING DEVICE

(71) Applicant: LG INNOTEK CO., LTD., Seoul (KR)

(72) Inventor: Yun Sang Song, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 441 days.

(21) Appl. No.: 18/030,248

(22) PCT Filed: Oct. 5, 2021

(86) PCT No.: PCT/KR2021/013578
§ 371 (c)(1),
(2) Date: Apr. 4, 2023

(87) PCT Pub. No.: WO2022/075681
PCT Pub. Date: Apr. 14, 2022

(65) Prior Publication Data
US 2023/0367185 A1    Nov. 16, 2023

(30) Foreign Application Priority Data

Oct. 5, 2020 (KR) .................. 10-2020-0127791
Oct. 5, 2020 (KR) .................. 10-2020-0127795

(51) Int. Cl.
*G03B 17/12* (2021.01)
*G03B 5/04* (2021.01)
*G03B 13/36* (2021.01)

(52) U.S. Cl.
CPC .............. *G03B 17/12* (2013.01); *G03B 5/04* (2013.01); *G03B 13/36* (2013.01)

(58) Field of Classification Search
None
See application file for complete search history.

(56) References Cited

U.S. PATENT DOCUMENTS

| 7,388,616 B2 | 6/2008 | Yamazaki |
| 8,928,996 B2 | 1/2015 | Kang et al. |
| 9,046,642 B2 | 6/2015 | Sugawara et al. |
| 9,298,017 B2 | 3/2016 | Sugawara et al. |

(Continued)

FOREIGN PATENT DOCUMENTS

| JP | 2004-180223 A | 6/2004 |
| JP | 2006-11018 A | 1/2006 |

(Continued)

*Primary Examiner* — Richard H Kim
(74) *Attorney, Agent, or Firm* — Birch, Stewart, Kolasch & Birch, LLP

(57) ABSTRACT

A camera module disclosed in an embodiment of the invention includes a substrate; an image sensor on the substrate; a lens holder having at least one lens on the image sensor; a holder guide portion spaced apart from the outside of the lens holder and having a plurality of guide portions; a plurality of first elastic springs having one end connected to the lens holder and the other end connected to the holder guide portion; a plurality of second elastic springs connecting the plurality of guide portions of the holder guide portion to each other; and a driving member disposed around the lens holder, and one end of the first elastic spring may be moved up or down along with the lens holder in an optical axis direction.

20 Claims, 13 Drawing Sheets

(56) References Cited

U.S. PATENT DOCUMENTS

| | | |
|---|---|---|
| 2004/0157652 A1 | 8/2004 | Yamazaki |
| 2005/0286352 A1 | 12/2005 | Inui |
| 2006/0181632 A1 | 8/2006 | Makii et al. |
| 2007/0092238 A1 | 4/2007 | Shirakata |
| 2009/0185796 A1 | 7/2009 | Tsutsumi et al. |
| 2010/0283887 A1 | 11/2010 | Topliss et al. |
| 2013/0016428 A1 | 1/2013 | Sugawara et al. |
| 2014/0253793 A1 | 9/2014 | Kang et al. |
| 2015/0309330 A1 | 10/2015 | Sugawara et al. |
| 2018/0367714 A1 | 12/2018 | Im et al. |
| 2024/0040256 A1 * | 2/2024 | Jang ................. H04N 23/54 |

FOREIGN PATENT DOCUMENTS

| | | |
|---|---|---|
| JP | 2006-251216 A | 9/2006 |
| JP | 2009-128377 A | 6/2009 |
| JP | 2011-501245 A | 1/2011 |
| JP | 2013-24944 A | 2/2013 |
| KR | 10-1997-0001569 B1 | 2/1997 |
| KR | 10-2005-0103348 A | 10/2005 |
| KR | 10-2006-0058143 A | 5/2006 |
| KR | 10-2007-0043643 A | 4/2007 |
| KR | 10-2007-0052443 A | 5/2007 |
| KR | 10-2010-0068701 A | 6/2010 |
| KR | 10-2011-0056864 A | 5/2011 |
| KR | 10-2011-0097551 A | 8/2011 |
| KR | 10-2012-0094596 A | 8/2012 |
| KR | 10-2014-0109184 A | 9/2014 |
| KR | 10-2015-0089648 A | 8/2015 |
| KR | 10-2017-0025936 A | 3/2017 |
| KR | 10-2018-0137277 A | 12/2018 |

* cited by examiner (a)

(b)

CAMERA MODULE AND MOVING DEVICE

CROSS REFERENCE TO RELATED APPLICATIONS

This application is the National Phase of PCT International Application No. PCT/KR2021/013578, filed on Oct. 5, 2021, which claims priority under 35 U.S.C. 119(a) to Patent Application No. 10-2020-0127791, filed in the Republic of Korea on Oct. 5, 2020, and Patent Application No. 10-2020-0127795, filed in the Republic of Korea on Oct. 5, 2020, all of which are hereby expressly incorporated by reference into the present application.

TECHNICAL FIELD

An embodiment of the invention relates to a camera module and a moving device having the same.

BACKGROUND ART

As smart phones or tablet PCs become popular, camera modules mounted on portable terminals such as the smart phones or tablet PCs are replacing portable cameras (digital cameras, etc.). Accordingly, users take it for granted that a high-spec camera is mounted on a portable terminal. As the development of camera modules with high-resolution sensors is rapidly increasing and multifunctional smart phones such as high-magnification phones and foldable phones are being developed, a part of the camera module is protruding, and there are demands to reduce the height of the camera module with high magnification. Recently, the camera module is applied to a mobile device such as a smart phone and a vehicle. In addition, functions capable of shifting or tilting an auto focus (AF) function of the camera module of a portable terminal and a lens holder are required.

DISCLOSURE

Technical Problem

An Embodiment of the invention may provide a camera module having an elastic spring that is stretched or restored so as to be up or down in the optical axis direction with respect to the lens holder. An embodiment of the invention may provide a camera module in which a plurality of holder guide portions is combined to each other and guide movement of the lens holder in the optical axis direction by an elastic spring. An embodiment of the invention may provide a moving device such as a mobile terminal or a vehicle having the camera module.

An embodiment of the invention may provide a camera module capable of being driven by separating the lens holders. An embodiment of the invention may provide a camera module that has a lens holder for pop-up and may be controlled with AF and OIS functions using an internal lens holder.

An embodiment of the invention may provide a moving device such as a mobile terminal or a vehicle having the camera module.

Technical Solution

A camera module according to an embodiment of the invention includes a substrate; an image sensor on the substrate; a lens holder having at least one lens on the image sensor; a holder guide portion spaced apart from an outside of the lens holder and having a plurality of guide portions; a plurality of first elastic springs having one end connected to the lens holder and the other end connected to the holder guide portion; a plurality of second elastic springs connecting the plurality of guide portions of the holder guide portion to each other; and a driving member disposed around the lens holder, wherein one end of the first elastic springs may be moved up or down along with the lens holder in an optical axis direction.

According to an embodiment of the invention, the driving member may include a mover disposed on an outer side or lower surface of the lens holder and a stator disposed on the substrate. The driving member may include a mover disposed on the outside or a lower surface of the lens holder and a stator disposed on an inner side of the holder guide portion. The plurality of first elastic springs may be three or four, and the plurality of second elastic springs may be three or four. The second elastic spring has one end connected to the lower guide portion and the other end thereof connected to the upper guide portion, and when the lens holder moves up or down in the optical axis direction, the upper guide portion goes up or down with respect to the lower guide portion, and the second elastic spring may be tensioned or restored when the upper guide portion moves. The holder guide portion may have a first guide portion stacked on a lower portion and a second guide portion stacked on an upper portion, and the first and second guide portions are combined with a plurality of grooves and a plurality of protrusions, and one end of the second elastic spring is connected to the first guide portion, and the other end thereof may be connected to the second guide portion. The holder guide portion may have two or more guide portions that are combined in the optical axis direction or a horizontal direction. Each of the plurality of guide portions may have a cylindrical shape.

A camera module according to an embodiment of the invention includes a substrate; an image sensor on the substrate; a first lens holder having a first lens on an object side; a cylindrical guide member around the first lens holder; covers disposed on both sides of an outer periphery of the guide member; a first driving member having an end portion coupled to the guide member; a second lens holder having a second lens between the image sensor and the first lens holder; a second driving member on an outer periphery of the second lens holder; and plurality of first elastic springs including one end connected to an outside of the first lens holder and the other end connected to the covers, wherein the image sensor and the first and second lenses are aligned in the optical axis direction, and the guide member is rotated by the first driving member to up or down the first lens holder in the optical axis direction.

According to an embodiment of the invention, the camera module includes a main substrate disposed on a periphery between the first lens holder and the second lens holder; a main case under the main substrate; a moving bracket to which the second lens holder is coupled to an inside of the main case; and a suspension wire connecting the main substrate and the substrate.

According to an embodiment of the invention, the second driving member may include a first driving portion for moving the second lens holder and the substrate in a direction perpendicular to the optical axis. The first driving portion includes a first stator disposed under the main substrate and a first mover opposite to the first stator and fixed to the moving bracket, the first stator is a coil, the first mover is a magnet, and the moving bracket may be moved in a direction orthogonal to the optical axis by the first driving portion. The second driving member includes a second driving portion, and the second driving portion includes a second mover, which is a coil wound around the second lens holder, a second stator facing the second mover and coupled to the moving bracket, and the second driving portion may move the second lens holder up or down in the optical axis direction. The guide member has a plurality of cylindrical portions, and the plurality of cylindrical portions includes a first cylindrical portion with a plurality of rotating grooves respectively coupled to the end of the first driving member and a first inclined groove disposed between the first cylindrical portion and the first lens holder; a second cylindrical portion disposed between the first cylindrical portion and the first lens holder and including a plurality of first protrusions coupled to the first inclined grooves and a plurality of second inclined grooves between the first protrusions; a third cylindrical portion disposed between the second cylindrical portion and the first lens holder and including second protrusions respectively coupled to the second inclined grooves and a plurality of circumferential grooves penetrating in a circumferential direction; and a fourth cylindrical portion disposed between the third cylindrical portion and the first lens holder and including a third protrusion coupled to the circumferential grooves, the fourth cylindrical portion may move the first lens holder in the optical axis direction by rotating the first to third cylindrical portions.

According to an embodiment of the invention, the fourth cylindrical portion includes a plurality of guide protrusions on an inner periphery thereof, and the guide protrusions may be coupled to an outer guide groove of the first lens holder and connected to one end of the first elastic springs. The covers may include a first cover disposed on both sides of the outer periphery of the first cylindrical portion and connected to the other end of the first elastic spring; and a second cover disposed outside the first cover, wherein at least one of the first and second covers may move in the optical axis direction along the first elastic spring and may restrict a movement of the first lens holder. The plurality of first elastic springs may be three or four. The second driving member may drive the second lens holder for AF and OIS.

A moving device according to an embodiment of the invention may include the camera module.

Advantageous Effects

The camera module according to the embodiment of the invention has an effect of reducing horizontal movement or tilt flow when the lens holder is moved in the optical axis direction. By combining a plurality of holder guide portions in the vertical direction and guiding movement of the lens holder in the optical axis direction with an elastic spring connected to the holder guide portion and the lens holder, the moving distance of the elastic spring is minimized and the stress transmitted to the elastic spring may be minimized. In addition, there is an effect of removing the ball guide or the guide shaft according to the movement of the lens holder.

The camera module according to the embodiment of the invention has a lens holder for pop-up and a lens holder for AF and OIS, so mode control is easy and there is an effect of not having to move the entire module at the same time. A lens holder for AF and OIS may be disposed inside the camera module to reduce the weight of the actuator. The camera module according to the embodiment of the invention may reduce the weight of a moving lens and improve performance.

Reliability of a camera module and a moving device having the camera module according to an embodiment of the invention may be improved.

BEST MODE

Figure 1:
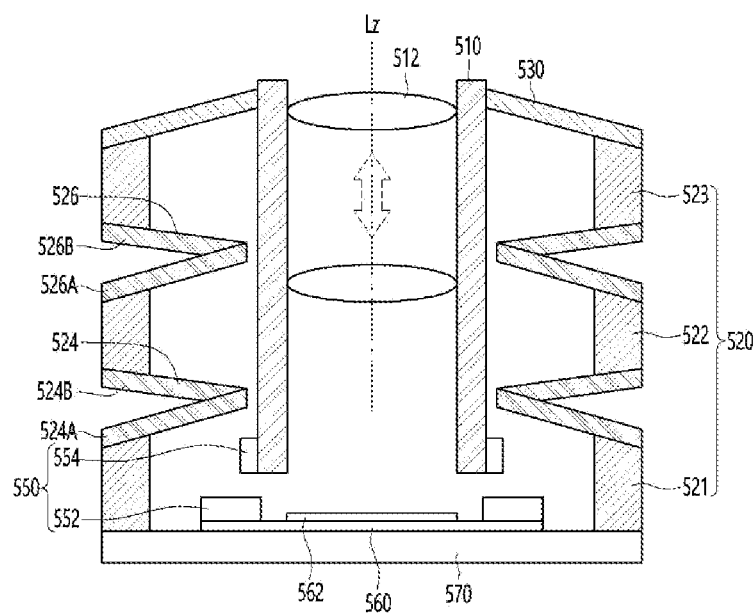
FIG. 1 is an example of a side cross-sectional view of a camera module according to a first embodiment of the invention.

Hereinafter, preferred embodiments of the invention will be described in detail with reference to the accompanying drawings. The technical idea of the invention is not limited to some of the described embodiments, but can be implemented in various different forms, and if it is within the scope of the technical idea of the invention, one or more of its components may be selectively combined and substituted between embodiments. In addition, terms (including technical and scientific terms) used in the embodiments of the invention, unless explicitly specifically defined and described, may be interpreted as a meaning that may be generally understood by those skilled in the art to which the invention belongs, and terms generally used, such as terms defined in the dictionary, may be interpreted in consideration of the context of the related technology. Also, terms used in the embodiments of the invention are for describing the embodiments and are not intended to limit the invention. In the present specification, the singular form may include a plural form unless specifically described in the phrase, and may include at least one of all combinations that may be combined as A, B, and C when described as "A and/or at least one (or more than one) of B and C". Also, terms such as first, second, A, B, (a), and (b) may be used to describe components of an embodiment of the invention. These terms are intended only to distinguish the components from other components and are not determined by their nature, sequence, or order. Also, when a component is described as being 'connected', 'coupled' or 'connected' to another component, not only when the component is directly connected, coupled or connected to another component, it may also be 'connected', 'coupled', or 'connected' due to another component between that component and the other component. In addition, when each component is described as being formed or disposed "up (above) or down (bottom)", the up (down) or down (bottom) includes not only when two components are in direct contact with each other, but also when one or more components are formed or disposed between two components. Also, when expressed as "up (above) or down (bottom)", it may include the meaning of not only the upward direction but also the downward direction based on one component.

The 'optical axis direction' used below is defined as a direction of the optical axis of the lens of the camera device. In this case, the optical axis of the lens may correspond to the optical axis of the image sensor. Meanwhile, the 'optical axis direction' may correspond to an 'up and down direction' or a 'z-axis direction'. The 'auto focus function' used below is defined as a function that automatically focus on the subject by moving the lens in the optical axis direction according to the distance of the subject so that a clear image of the subject may be obtained in the image sensor. Meanwhile, 'auto focus' may be used interchangeably with 'AF'. The 'hand shake correction function' used below is defined as a function of moving or tilting a lens in a direction perpendicular to the optical axis direction to offset vibration (movement) generated in the image sensor by an external force. Meanwhile, 'hand shake correction' may be used interchangeably with 'optical image stabilization (OIS)'.

Hereinafter, "dual or triple camera" and "camera device" may be used interchangeably. That is, the camera device may be described as including two or three or more lens modules. Optical devices may include any one of cell phones, cell phones, smart phones, portable smart devices, digital cameras, laptop computers, digital broadcasting terminals, personal digital assistants (PDA), portable multimedia players (PMPs), camera device for vehicle, and a navigation. However, a type of optical device is not limited thereto, and any device for taking a video or photo may be included in the optical device. The optical device may include a main body. The main body may form the appearance of the optical device. The main body may accommodate a camera device. A display portion may be disposed on one surface of the main body. For example, a display portion and a camera device may be disposed on one surface of the main body, and a camera device may be additionally disposed on the other surface (a surface positioned opposite to the one surface) of the main body. The optical device may include a display portion. The display portion may be disposed on one surface of the main body. The display portion may output an image photographed by the camera device. The optical device may include a camera device. The camera device may be disposed on the main body. At least a part of the camera device may be accommodated inside the main body. A plurality of camera devices may be provided. The camera device may be disposed on one surface of the main body and the other surface of the main body. The camera device may capture an image of a subject. The camera device may include a lens driving device. The lens driving device may be a lens driving motor or a voice coil motor. The camera device may include at least one or both of an AF actuator and an OIS actuator.

First Embodiment

Figure 2:
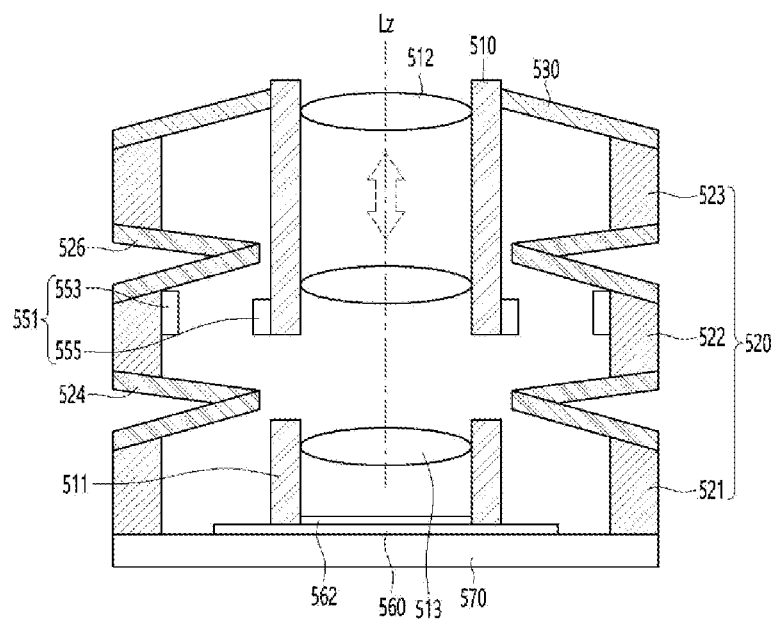
FIG. 2 is a first modified example of the camera module of FIG. 1.
Figure 3:
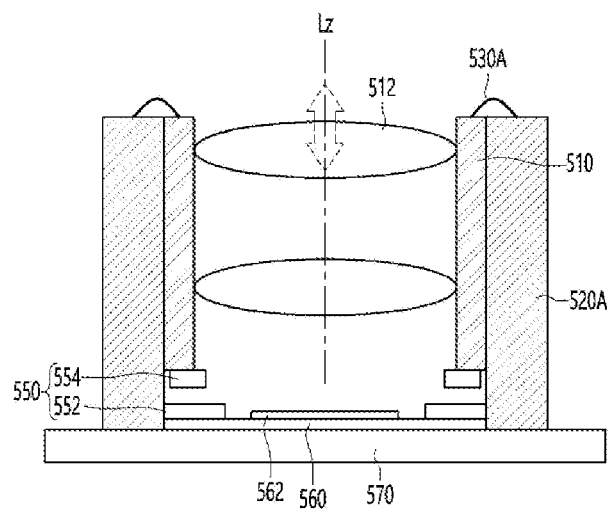
FIG. 3 is a second modified example of the camera module of FIG. 1.
Figure 4:
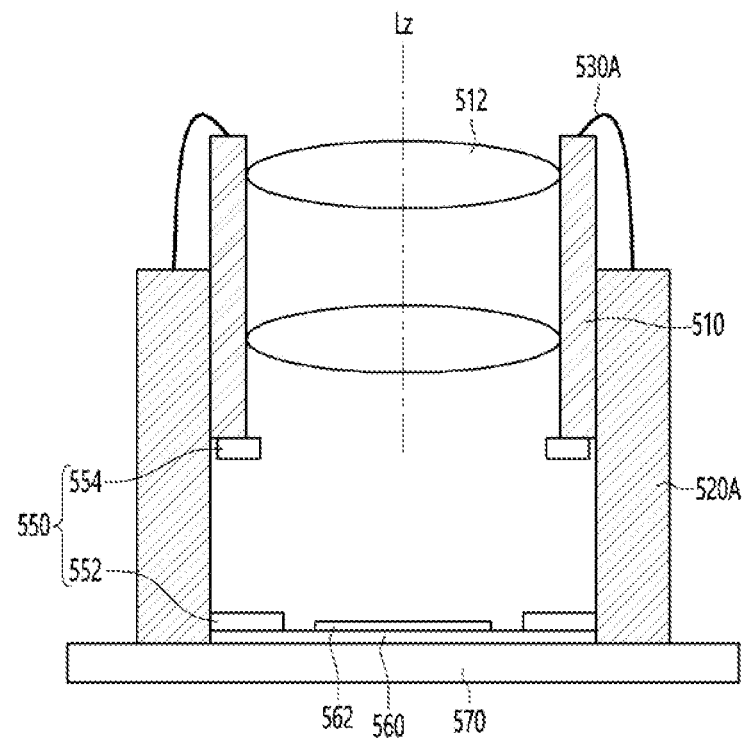
FIG. 4 is a driving example of a lens holder in the camera module of FIG. 3.
Figure 5:
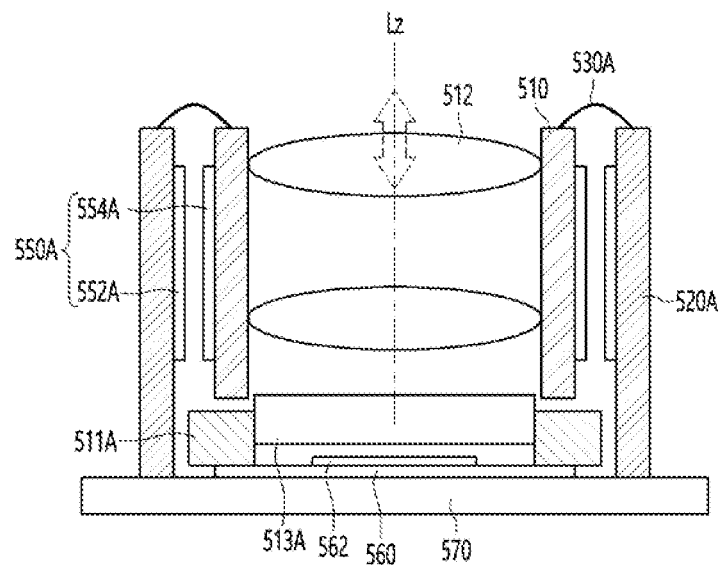
FIG. 5 is a third modified example of the camera module of FIG. 1.
Figure 6:
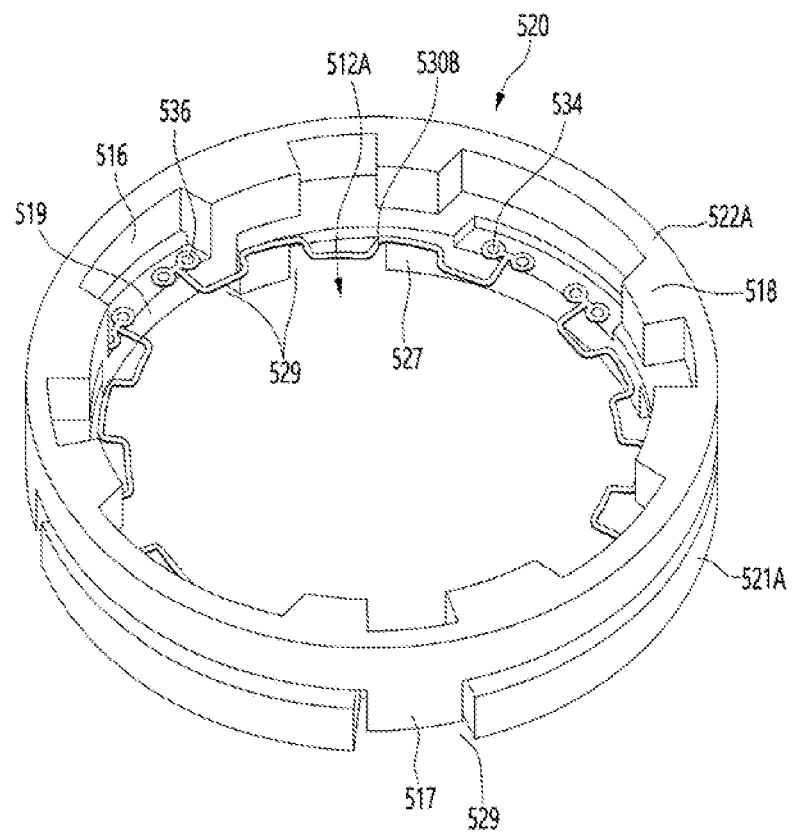
FIG. 6 is a perspective view showing an example of coupling of guide portions and a second elastic spring in the camera module according to an embodiment of the invention.
Figure 7:
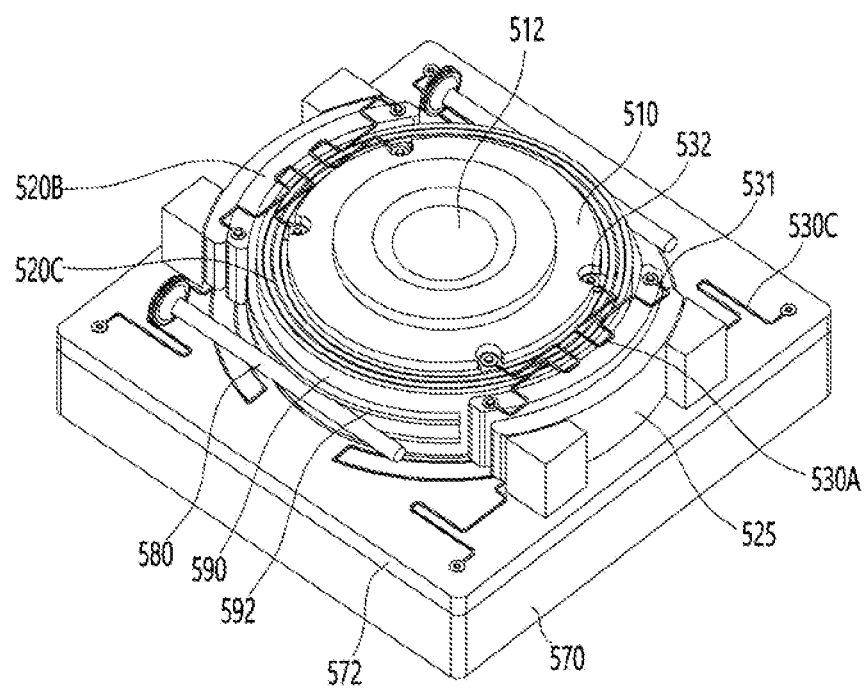
FIG. 7 is a perspective view of a camera module in which a lens holder and a first elastic spring are coupled according to an embodiment of the invention.

FIG. 1 is an example of a side cross-sectional view of a camera module according to a first embodiment of the invention, FIG. 2 is a first modified example of the camera module of FIG. 1, FIG. 3 is a second modified example of the camera module of FIG. 1, FIG. 4 is a driving example of a lens holder in the camera module of FIG. 3, FIG. 5 is a third modified example of the camera module of FIG. 1, FIG. 6 is a perspective view showing an example of coupling between guide portions and a second elastic spring in the camera module according to an embodiment of the invention, and FIG. 7 is a perspective view of a camera module in which a lens holder and a first elastic spring are coupled according to an embodiment of the invention.

Referring to FIG. 1, the camera module according to the invention may include a lens holder 510 having at least one lens 512, a substrate 560 disposed a lower portion of the lens holder 510, and an image sensor 562 disposed on the substrate 560, a first elastic spring 530 having one end connected to the lens holder 510, and a holder guide portion 520 covering an outside of the lens holder 510 and connected to the first elastic spring 530, a plurality of second elastic springs 526 connecting the guide portions 521, 522, and 523 of the holder guide portion 520, a driving member 550 for driving the lens holder 510 in the optical axis direction, and a support plate 570 supporting the holder guide portion 520 and the substrate 560.

The lens holder 510 may have a through hole therein and include one or a plurality of lenses 512. The lens holder 510 may be defined as a lens barrel. Each of the plurality of lenses 512 may have an incident surface through which light is incident and an exit surface through which light is emitted, and may be aligned in an optical axis Lz. The plurality of lenses 512 and the image sensor 562 may overlap in an optical axis or may be aligned in optical axes orthogonal to each other using a reflection mirror (not shown). At least one or all of the plurality of lenses 512 may be a plastic material, or the other one or all may be a glass material.

Both ends of the first elastic spring 530 are connected to the lens holder 510 and the holder guide portion 520, have a predetermined shape, and may have elasticity that is stretched or compressed (or restored) in the direction of the optical axis Lz. A plurality of first elastic springs 530 may be spaced apart from each other along the outer periphery of the lens holder 510. One end of each of the first elastic springs 530 may be connected to the outside of the lens holder 510 and the other end thereof may be connected to an upper portion of the holder guide portion 520.

For example, as shown in FIG. 7, two, three, or four or more first elastic springs 530A may have both ends connected at both ends to the lens holder 510 and the holder guide portion 520B, respectively. The first elastic spring 530 may support the lens holder 510 when the lens holder 510 moves in the optical axis direction and provide elasticity within a movable tension range. That is, one end of the first elastic spring 530 may be moved up or down in the optical axis direction, and the other end thereof may be fixed or moved together with the moving holder guide portion 520B. The lens holder 510 may be moved in the optical axis direction for AF or zoom. The first elastic spring 530 may include a coiled spring or a plate-shaped spring. One end of each of the first elastic springs 530 may be disposed at an equal angle with respect to the optical axis Lz along the upper end and outer circumference of the lens holder 510.

As shown in FIG. 1, the substrate 560 is disposed on the support plate 570, and the image sensor 562 may be disposed on an upper portion of the substrate 560. The image sensor 562 may convert light incident through the lens 512 into an electrical signal. The image sensor 562 may be any one of a charge coupled device (CCD), complementary metal-oxide semiconductor (CMOS), CPD, and CID. The image sensor 562 may be disposed in plurality, one of which may be a color (RGB) sensor, and the other may be a black and white sensor. The image sensor 562 may be disposed on the substrate 560. In the image sensor 562, the ratio of the length of the long side to the length of the short side may be 4:3 or 16:9. The substrate 560 may include FPCB.

An optical filter (not shown) may be disposed on the image sensor 562, and the optical filter may protect the image sensor 562. The optical filter may be an infrared filter, and may block infrared light from being incident on the image sensor 562. The optical filter may be formed by coating an infrared blocking coating material on a flat plate-shaped optical filter such as a cover glass for protecting an imaging surface or a cover glass. The optical filter may be an infrared absorption filter or an infrared reflection filter. Here, the camera module may further include an internal lens holder having other lens(es) between the image sensor 562 and the lens holder 510 having the lens 512 closest to the object side. The inner lens holder may be moved in an optical axis direction or/and a horizontal direction by another driving member.

The holder guide portion 520 is disposed on the outer circumference of the lens holder 510 and may guide the outer periphery of the lens holder 510. The holder guide portion 520 supports the other end of the first elastic spring 530 and guides the flow according to the tension or compression (or restoration) of the first elastic spring 530. A lower end of the holder guide portion 520 may be disposed on the support plate 570 along an outer side of the image sensor 562. The support plate 570 may support the entirety of the camera module. A separate cover may be further disposed outside the holder guide portion 520 to support the holder guide portion 520. The holder guide portion 520 includes a plurality of guide portions 521, 522, and 523, and the plurality of guide portions 521, 522, and 523 may have a cylindrical shape or may have a cylindrical shape separated into at least two. The plurality of guide portions 521, 522, and 523 may be disposed to overlap each other in the direction of the optical axis Lz. The plurality of guide portions 521, 522, and 523 may be formed in a vertical direction with two or more cylinders.

As another example, in the plurality of guide portions 521, 522, 523, two or more concentric cylinders may be overlapped in a direction perpendicular to the optical axis (horizontal direction), and when overlapping in the horizontal direction, the inner/outer cylinders may be combined by a separate combining member. For example, as shown in FIG. 6, the first guide portion 521A of the holder guide portion 520 may be combined to the second guide portion 522A by using a structure of protrusions 517, 519, and 527 or/and grooves 516 and 529, at this time, the first and second guide portions 521A and 522A are cylindrical bodies and may be formed of a plastic material. The first guide portion 521A may include protrusions 517 and 519 protruding from an inner lower portion thereof, and the second guide portion 522A may include a groove 529 into which the protrusions 517, 519, and 527 are inserted at the inner lower portion. The second guide portion 522A has a separate groove 516 on its inner upper portion to be combined with the protrusions of other guide portion, and has an upper protrusion 518 to support the lens holder inserted inside or to couple the other end of the first elastic spring. The protrusions 517, 519, and 527 and the groove 529 may be hook-type couplings. Although the first and second guide portions 521A and 522A are provided in a cylindrical shape, and may be provided in a separate shape of ½ size (i.e., 2 pieces), ⅓ size (i.e., 3 pieces) or ¼ size (i.e., 4 pieces) of the cylindrical shape.

As shown in FIGS. 1 and 2, when the plurality of guide portions 521, 522, and 523 are three, and includes a first guide portion 521 at the lower portion, a second guide portion 522 at the middle, and a third guide portion 523 at the upper portion, as shown in FIG. 6, the first guide portion 521 and the second guide portion 522, and the second guide portion 522 and the third guide portion 523 may be combined in a combined structure of protrusion and groove. As such, since the first to third guide portions 521, 522, and 523 are combined in the optical axis direction and support each other, the first to third guide portions 521, 522, and 523 may be stably positioned outside the lens holder 10. As another example, the first to third guide portions 521, 522, and 523 may be combined into an outer/middle/inner laminated structure, combined into a combined structure with each other, or connected by a second elastic spring.

The guide portions 521, 522, and 523 of the holder guide portion 520 may be connected to each other by the second elastic springs 524 and 526. For example, the lower second elastic spring 524 may have one end 524A connected to the first guide portion 521 and the other end 524B connected to the second guide portion 522, and the upper second elastic spring 526 may have one end 526A connected to the second guide portion 522 and the other end 526B connected to the third guide portion 523. Each of the lower and upper second elastic springs 524 and 526 may be implemented as shown in FIG. 6, for example, one end 534 of the second elastic spring 530B is connected to an inside of the lower first guide portion 521A, the other end 536 thereof may be connected to an inside of the upper second guide portion 522A, and the second elastic spring 530B may include a concave-convex shape to provide a predetermined elasticity between both ends 534 and 536.

As such, the holder guide portion 520 supports and guides the lens holder 510 when the lens holder 510 moves in the optical axis direction from the outside of the lens holder 510, and at this time, the second elastic spring 524 and 526 are stretched and supported on the outer periphery of the moving lens holder 510, the total length of the second elastic springs 524 and 526 may not be long, and the second elastic spring 524 and 526 may prevent an increase the width of the lens holder 510 in the horizontal direction. In addition, when the width of the lens holder 510 in the horizontal direction is increased, there is a problem that the lens holder may shake left/right, and the invention may prevent this problem. Accordingly, it is possible to prevent an increase in the size of the camera module. The lengths of the second elastic springs 524 and 526 may vary depending on the outer diameter size and movement range of the lens holder 510.

The second elastic springs 524 and 526 may support reciprocating movement in the direction of the optical axis Lz from the inside of the guide portions 521, 522, and 523 of the holder guide portion 520. The second elastic springs 524 and 526 may include coiled springs or plate-shaped springs. The plurality of guide portions 521, 522, and 523 may have the same diameter as each other. As another example, the plurality of guide portions 521, 522, and 523 may have the largest lower diameter and the smallest upper diameter.

The driving member 550 may include a plurality of stators 552 disposed on the substrate 560 and a plurality of movers 554 disposed under the lens holder 510. As another example, the driving member 550 may move the holder guide portion 520 separately. In this case, the movers 554 may be disposed around the lower portion or the center of the holder guide portion 520. The stator 552 may be a coil or a magnet, and the mover 554 may be a magnet or a coil. The stator 552 and the mover 554 may face each other in the direction of the optical axis. As another example, the stator 552 and the mover 554 may face each other in a horizontal direction perpendicular to the optical axis. The driving member 550 may include a voice coil motor (VCM) actuator, and may be disposed in one or plurality on the periphery of the lens holder 510, that is, a lower side or/and an outer side of the lens holder 510, but is not limited thereto. The driving member 550 in the camera module is a driving means having different functions, and may include an actuator for auto focus, an actuator for OIS, and an actuator for tilt. As another example, the driving member 550 may include a piezo member. Here, the invention raises or lowers the lens holder 510 in the optical axis direction by using the mover 554 in the driving member 550, and at this time, the movement of the lens holder 510 is connected to the holder guide portion 520. While supported by the first elastic spring 530, the holder guide portion 520 may be moved up or down in the optical axis direction by tension or compression (or restoration) of the second elastic springs 524 and 526. Accordingly, the lens holder 510 is easily moved, and since the first elastic spring 530 and the second elastic springs 524 and 526 support the movement of the lens holder 510 in the optical axis direction, it is possible to prevent the lens holder 510 from shifting or tilting in the horizontal direction.

As shown in FIG. 2, a sub lens holder 511 having a lower lens 513 may be disposed at a lower portion of the lens holder 510. In this case, the driving member 551 may be disposed on the outer periphery of the lens holder 510, and the driving member 551 has a mover 555 on the outside of the lens holder 510 and a stator 553 disposed inside the holder guide portion 520 opposite thereto. The driving member 551 may include at least one of a piezo member, an actuator, and a stepping motor. The sub-lens holder 511 may be moved up or down for AF by a separate sub-drive member, or may be moved in a horizontal direction for the OIS function, and the sub-drive member may include a mover attached to the sub-lens holder 511 and a stator opposite thereto.

As shown in FIGS. 3 and 4, the lens holder 510 may be coupled to the inside of the holder guide portion 520A. For example, as shown in FIG. 7, the holder guide portion 520B and the lens holder 510 may be combined inside/outside, and may be connected to each other by a first elastic spring 530A. Here, in the holder guide portion 520B, an upper guide portion and a lower guide portion may be connected to each other by a second elastic spring, and the structure of FIG. 6 will be referred to below. The holder guide portion 520A guides the movement of the lens holder 510 in the optical axis direction, and for additional up, the holder guide portion 520A may have two or three guide portions stacked and combined vertically and may be separated and moved by the second elastic spring.

In the driving member 550, the mover 554 may be disposed on a lower portion or an outer side of the lens holder 510, and the stator 552 may be disposed on the substrate 560 opposite the mover 554 or disposed inside the holder guide portion 520A. The driving member 550 may include at least one of a piezo member, an actuator, or a stepping motor. Here, as another example, the first driving member for driving the lens holder 510 and the second driving member for driving the holder guide portion 520A may be disposed separately. The first driving member may be a VCM actuator, and the second driving member may be a piezo member or a VCM actuator.

As shown in FIGS. 1 and 5, a holder guide portion 520A is disposed on the outer circumference of the lens holder 510, and two or three guide portions may be stacked and combined in the optical axis direction of the holder guide portion 520A, and a second elastic spring may be coupled to a middle of the holder guide portion 520A. As shown in FIG. 5, in the driving member 550A, a plurality of movers 554A may be disposed outside the lens holder 510, and a plurality of stators 552A may be disposed inside the holder guide part 520A at a position opposite to the movers 554A. The driving member 550A may include at least one of a piezo member, an actuator, and a stepping motor. Here, as another example, a separate sub-driving member for driving the holder guide portion 520A may be further included in addition to the driving member for driving the lens holder 510. The driving member may be an actuator, and the sub-driving member may be a piezo member. When the holder guide portion 520A is driven by further disposing such the sub-driving member, the movement distance of the total lens may be increased. Also, a sub-lens holder 511A may be disposed under the lens holder 510, and the sub-lens holder 511A may have a lens 513A and may be disposed on the image sensor 562. The sub-lens holder 511A may have an AF function or/and an OIS function by a separate driving member.

An example of coupling the first and second guide portions and the first and second elastic springs will be described with reference to FIG. 6. The first guide portion 521A and the second guide portion 522A have a cylindrical shape having a through hole 512A therein, and may be combined to each other. The first guide portion 521A has a plurality of grooves 529 on the outside and a plurality of protrusions 517, 519, and 527 on the inside, and the second guide portion 522A has a plurality of grooves 516 on the inside and a plurality of protrusions 517 on the outside. Accordingly, the inner protrusion 519 of the second guide portion 522A may be combined between the inner groove 529 of the first guide portion 521A and the protrusions 519 and 527, and the outer protrusion 527 of the second guide portion 522A may be combined with the outer groove 529 of the first guide portion 521A. The second elastic spring 530B has one end 534 coupled to the inner protrusion 527 of the lower first guide portion 521A, and the other end 536 coupled to the inner protrusion 519 of the upper second guide portion 522A. A groove 516 is provided inside the second guide portion 522A to which one end 534 and the other end 536 of the second elastic spring 530B are coupled, thereby providing a fastening or bonding space between the one end 534 and the other end 536. The inner protrusions 518 of the first and second guide portions 521A and 522A may function as stop protrusions that limit movement during up/down movement or guide the outer periphery of the lens holder. Here, the inner protrusions 518 of the second guide portion 522A may protrude to guide the outside of the lens holder with a predetermined gap. The inner protrusion 518 of the second guide portion 522A may be connected to the other end of the first elastic spring having one end of which is connected to the lens holder, or may be combined with another upper guide portion. The second elastic spring 530B may be disposed in plurality along the inner circumference where the first and second guide portions 521A and 522A are combined. Since the second elastic spring 530B has one end 534 connected to one side of the inner periphery of the first guide portion 520A, and the other end 536 connected to one side of the inner periphery of the first guide portion 520A, the second elastic spring 530B may move the second guide portion 522A in an up or down direction in the optical axis direction on the first guide portion 521A by elasticity, and may be guided when restored by the stop protrusion. Two, three, or four or more second elastic springs 530B may be disposed along the inner periphery of the first and second guide portions 521A and 522A.

FIG. 7 is an example of the invention, a structure in which a first elastic spring 530A is disposed on a lens holder 510 and guide portions 520C, 520B, and 525 are disposed around the lens holder 510. Referring to FIG. 7, a middle bracket 572 is disposed on a support plate 570, and at least one or two of an image sensor, an optical filter, other sub-lens holders, and a driving member may be disposed inside the support plate 570. The lens holder 510, the inner guide portions 520C, the holder guide portions 520B, and the outer guide portions 525 may be supported on the support plate 570 and the middle bracket 572. The lens holder 510 may be connected to the holder guide portion 520B by a first elastic spring 530A. The first elastic spring 530A may support the movement of the lens holder 510 when it moves up or down in the optical axis direction. The inner guide portion 520C has a plurality of guides overlapped from the inside toward the outside, and is stretched or compressed (or restored) in the groove 592 of the outer guide 590 where the end of the driving member 580 is located by driving the outer driving member 580, and at this time, the outer guide portion 590 may rotate in a forward or reverse direction. When the outer guide rotates, the inner guides may move the lens holder 510 up or down in the optical axis direction. That is, the lens holder 510 may be moved up or down by the guides of the inner guide portion 520C by the driving member 580. Here, the guides of the inner guide portion 520C may change the driving force in the direction of the optical axis in the rotational direction through a combination of physical grooves or protrusions. At this time, the first elastic spring 530A is stretched or contracted when the lens holder 510 is up or down in the optical axis direction, and the holder guide portion 520B may support the other end 531 of the first elastic spring 530A. The driving member 580 may be implemented as a piezo.

As another example, in addition to the driving member 580, a sub-driving member for directly moving the lens holder 510 may be included and the sub-driving member may be disposed on a lower portion of the lens holder 510 as shown in FIG. 1. At this time, the first elastic spring 530A is stretched or contracted when the lens holder 510 is moved up or down in the optical axis direction by the driving member 550 of FIG. 1, and the holder guide portion 520B supports the first elastic spring 530A. As another example, a plurality of guide portions may be overlapped each other in the holder guide portions 520B, and the second elastic spring 530B as shown in FIG. 6 may be coupled therein.

A support elastic spring 530C is disposed on the middle bracket 572, and the support elastic springs 530C are coupled to the lower end of the outer guide portions 525 or the holder guides portions 520B, and may limit the movement of the outer guide portions 525, or the holder guides 520B in the optical axis direction to a predetermined distance.

Second Embodiment

Figure 8:
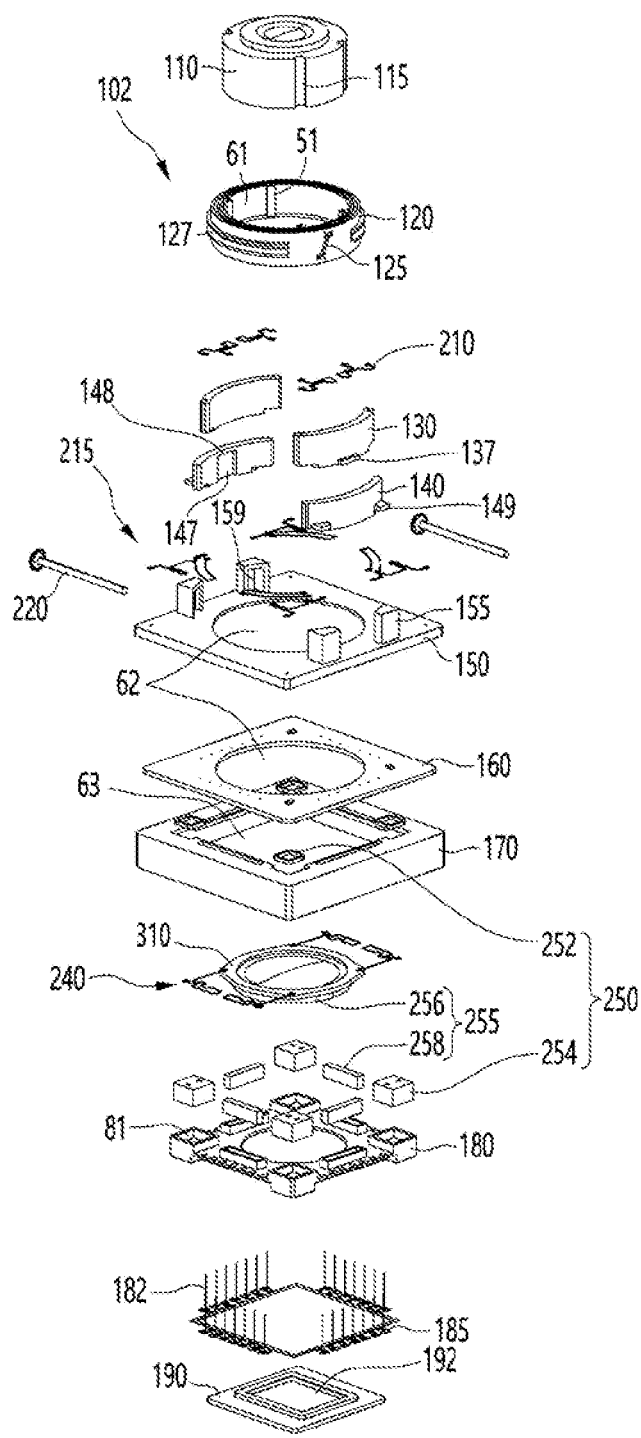
FIG. 8 is an exploded perspective view of a camera module according to a second embodiment of the invention.
Figure 9:
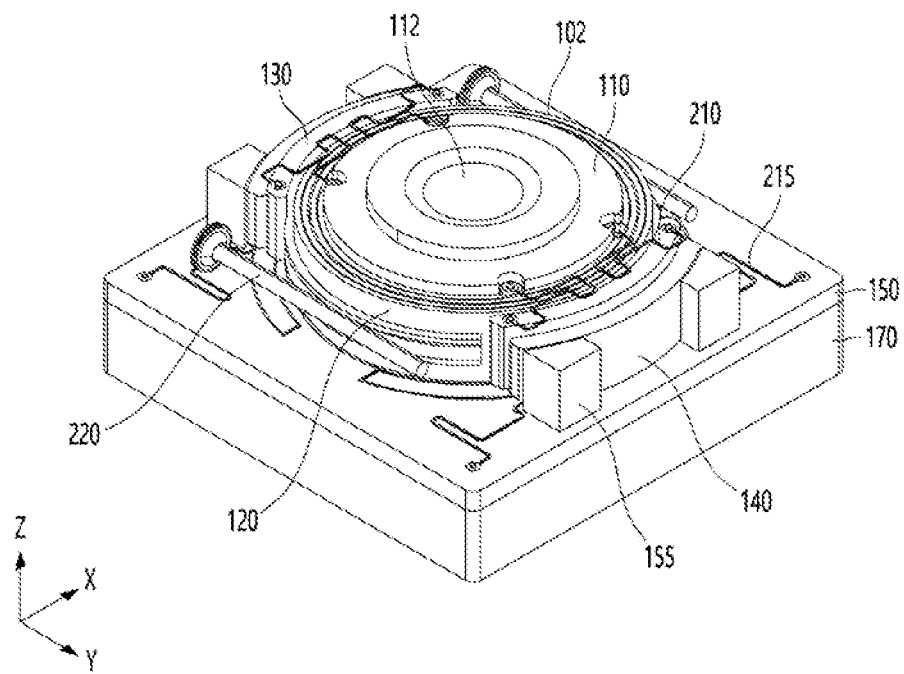
FIG. 9 is a combined perspective view of the camera module of FIG. 8.
Figure 10:
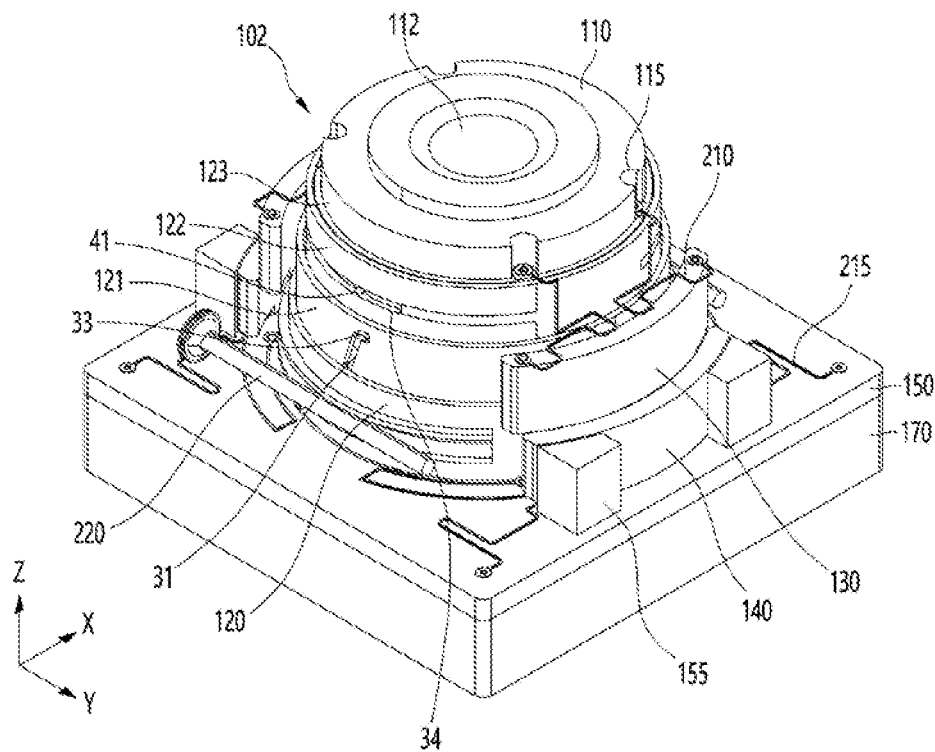
FIG. 10 is a perspective view illustrating a pop-up state of a lens holder in the camera module of FIG. 9.
Figure 11:
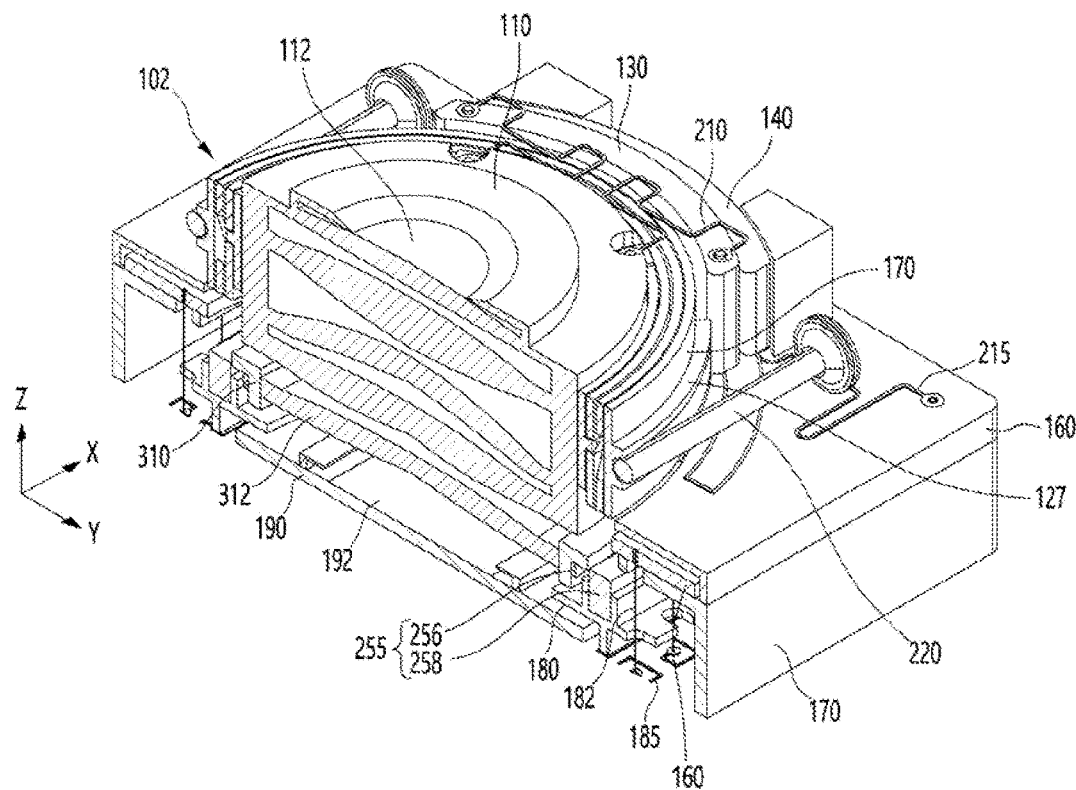
FIG. 11 is an example of a cross-sectional side view of the camera module of FIG. 9.
Figure 12:
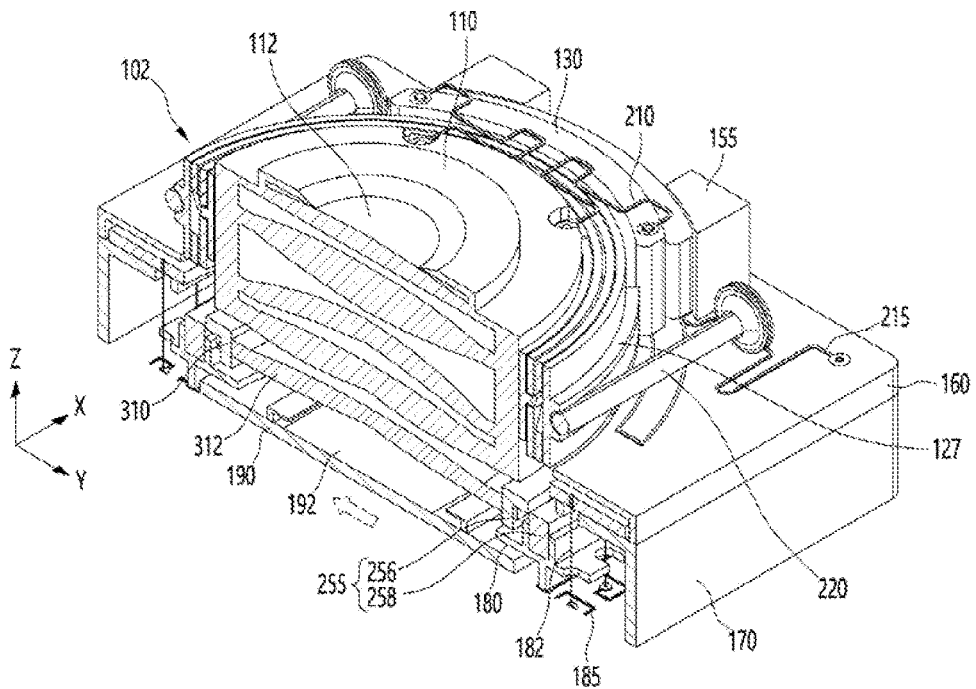
FIG. 12 is a diagram illustrating an example of movement of a substrate having an image sensor in FIG. 11.
Figure 13:
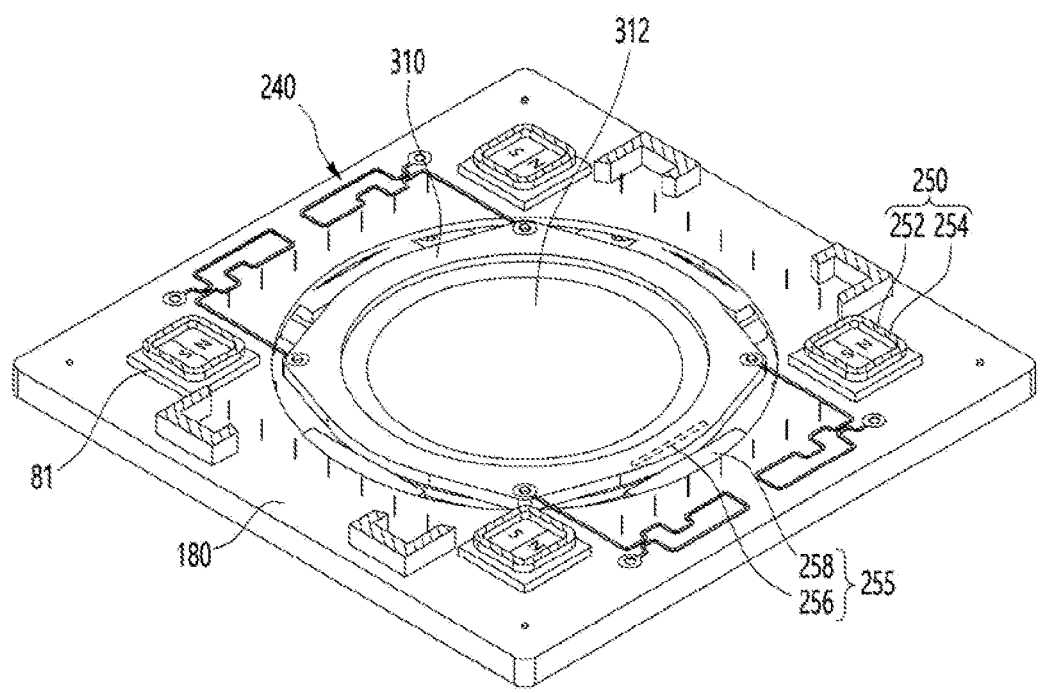
FIG. 13 is a perspective view of a moving bracket for driving the second lens holder of the camera module in FIG. 8.
Figure 14:
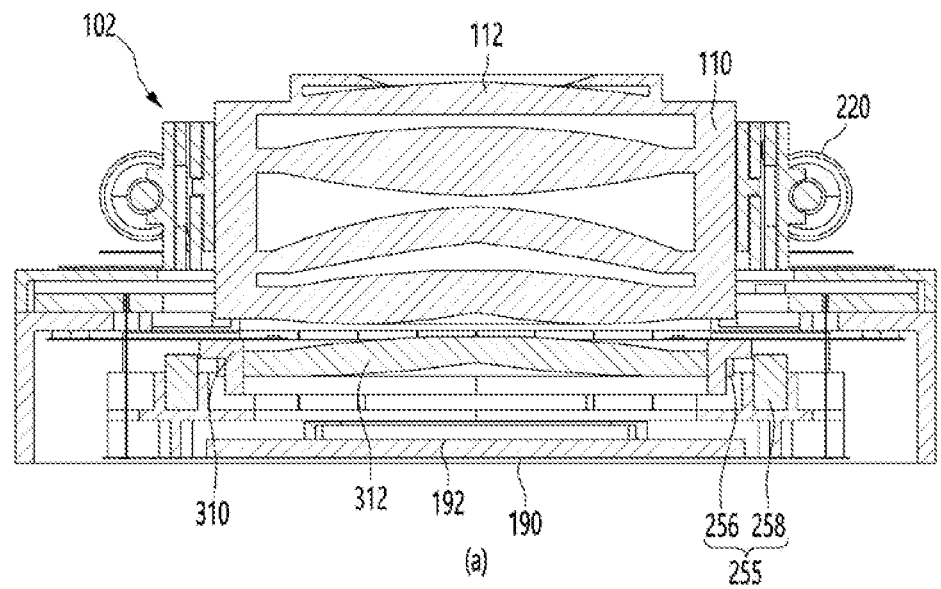
FIG. 14(*a*)(*b*) is an example of AF of the second lens holder in the camera module according to the second embodiment of the invention.
Figure 14:
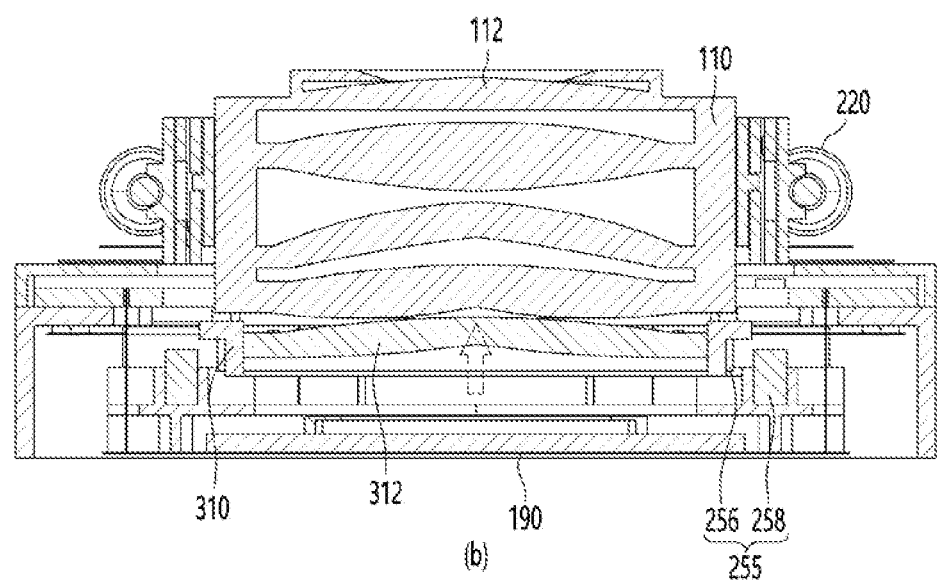
Figure 15:
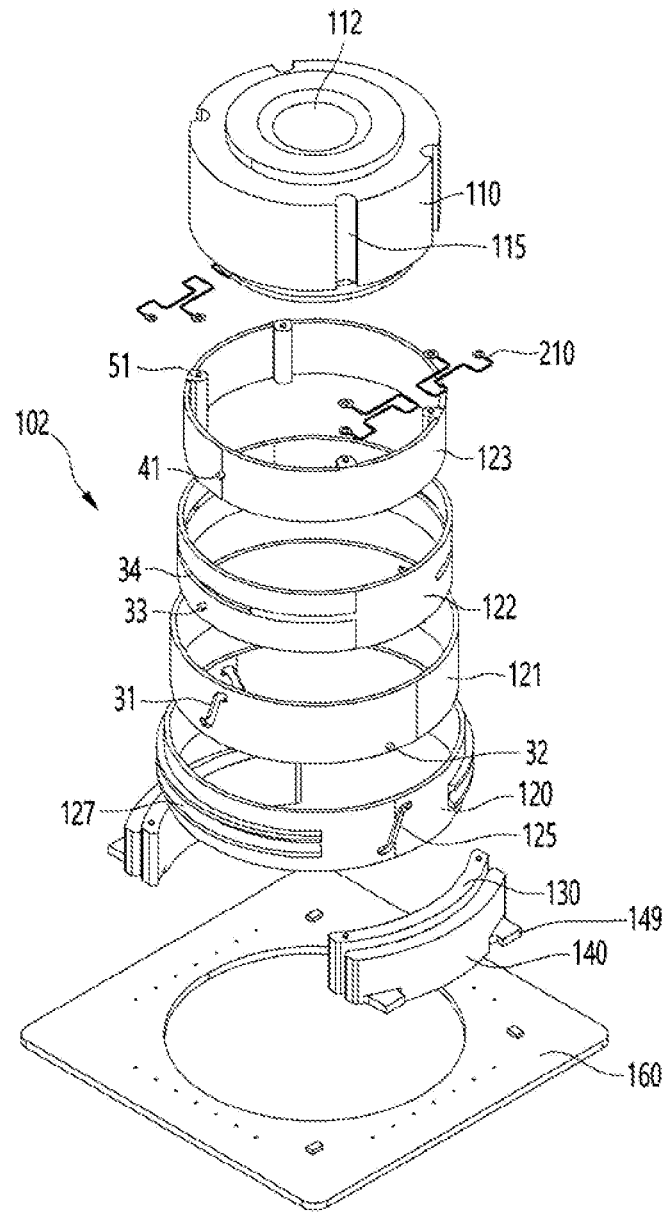
FIG. 15 is an example of an exploded perspective view illustrating a guide member for moving a first lens holder in the camera module of FIG. 8.
Figure 16:
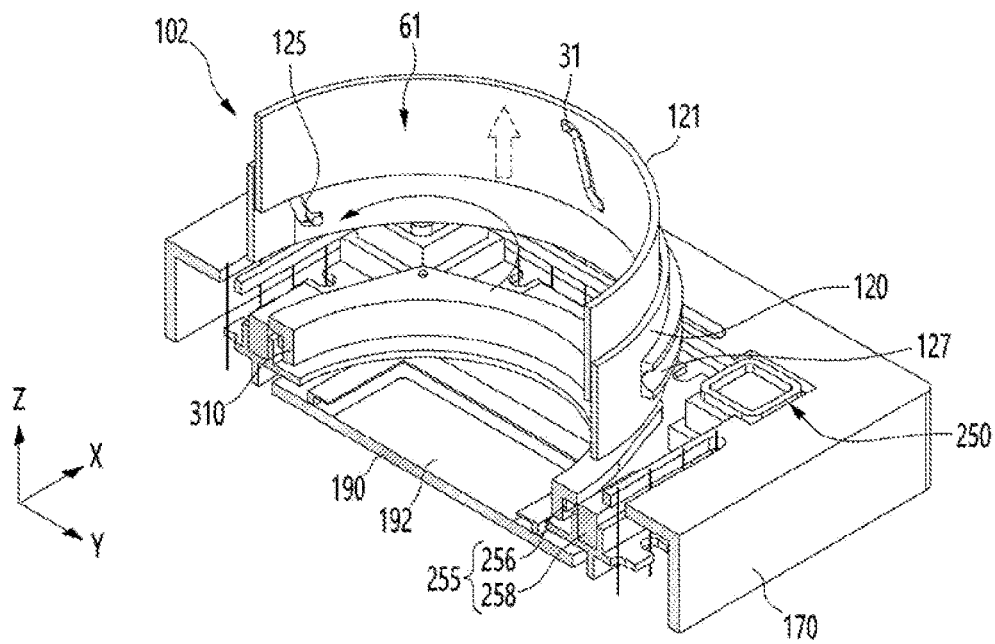
FIG. 16 is a perspective view illustrating the sliding structure of the guide member around the first lens holder in FIG. 15.

FIG. 8 is an exploded perspective view of a camera module according to a second embodiment of the invention, FIG. 9 is a combined perspective view of the camera module of FIG. 8, FIG. 10 is a perspective view showing a pop-up state of the lens holder in the camera module of FIG. 9, FIG. 11 is an example of a side cross-sectional view of the camera module of FIG. 9, FIG. 12 is a view showing an example of movement of a substrate having an image sensor in FIG. 11, FIG. 13 is a perspective view of a bracket for driving a second lens holder of the camera module of FIG. 8, FIG. 14(a)(b) is an example of AF of the second lens holder in the camera module of FIG. 9, FIG. 15 is an exploded perspective view showing cylindrical parts for moving the first lens holder of FIG. 8, and FIG. 16 is a perspective view of the internal lens holder of FIG. 15, and FIGS. 17 to 19 are side cross-sectional views of the camera module of FIG. 9 and are a drawing explaining the coupling relationship of the cylindrical portions for the movement of the first lens holder. Here, the structure of FIG. 9 is the same as that of FIG. 7, but for convenience of description of the second embodiment, reference numerals corresponding to the structure of the second embodiment will be given and described.

Referring to FIGS. 8 to 11, the camera module according to the second embodiment of the invention may include a first lens holder 110 having at least one first lens 112, a guide member 102 on an outer side of the first lens holder 110, a first driving member 220, covers 130 and 140, a middle bracket 150, a main substrate 160, a second driving member 250, a main case 170, a moving bracket 180, a second lens holder 310 having at least one second lens 312, a substrate 190 and an image sensor 192.

The first lens holder 110 has a cylindrical shape, includes at least one first lens 112 therein, and has a plurality of guide grooves 115 formed in an optical axis direction on an outer circumference. The first lens 112 may include one or more than two lenses. The guide member 102 may have a cylindrical shape and may have a through hole 61 larger than the diameter of the first lens holder 110. The first lens holder 110 may be inserted into and coupled to the through hole 61 of the first lens holder 110. Guide protrusions 51 protruding in a vertical direction are disposed on the inner periphery of the guide member 102, and the guide protrusions 51 may be inserted into and coupled to the guide groove 115 of the first lens holder 110.

The guide member 102 is rotated in the circumferential direction by the first driving member 220, and the first lens holder 110 moves in the optical axis direction by the rotation of the guide member 102. As shown in FIG. 10, the guide member 102 may pop-up the first lens holder 110 in the optical axis Z direction or restore it to its original position by the first driving member 220. The guide member 102 may be rotated by the driving force of the first driving member 220 transmitted to the outside. The first driving member 220 is coupled to the outer groove 127 of the guide member 102 and may be implemented as a piezoelectric element. When voltage is applied to the first driving member 220, mechanical deformation is transferred to the outer groove 127 of the guide member 102, so that the outer cylindrical portion of the guide member 102 rotates. When the first lens holder 110 is exposed to the outside of the mobile device, the driving member installs a piezoelectric element that is not oversized such as a VCM, the first driving member 220 and the guide member 102 may control the pop-up of the first lens holder 110 to adjust the focusing and zoom magnification.

The covers 130 and 140 may include a plurality of first covers 130 disposed around the guide member 102 and a plurality of second covers 140 disposed outside each of the first covers 130. The plurality of first covers 130 are respectively disposed on opposite sides of the guide member 102 and have a curved shape, and face each other along the outer curved surface of the guide member 102. Each of the first covers 130 may have a length less than ½ of the circumferential length of the guide member 102, for example, in the range of ⅓ to ⅕. The plurality of first covers 130 may face each other in the second axis Y direction. The second covers 140 has the same outer shape as each of the first covers 130 and supports the outer side of each of the first covers 130. Each of the second covers 140 may have a length less than ½ of the circumferential length of the guide member 102, for example, ⅓ to ⅕. The plurality of second covers 140 may face each other in the second axis Y direction.

Figure 17:
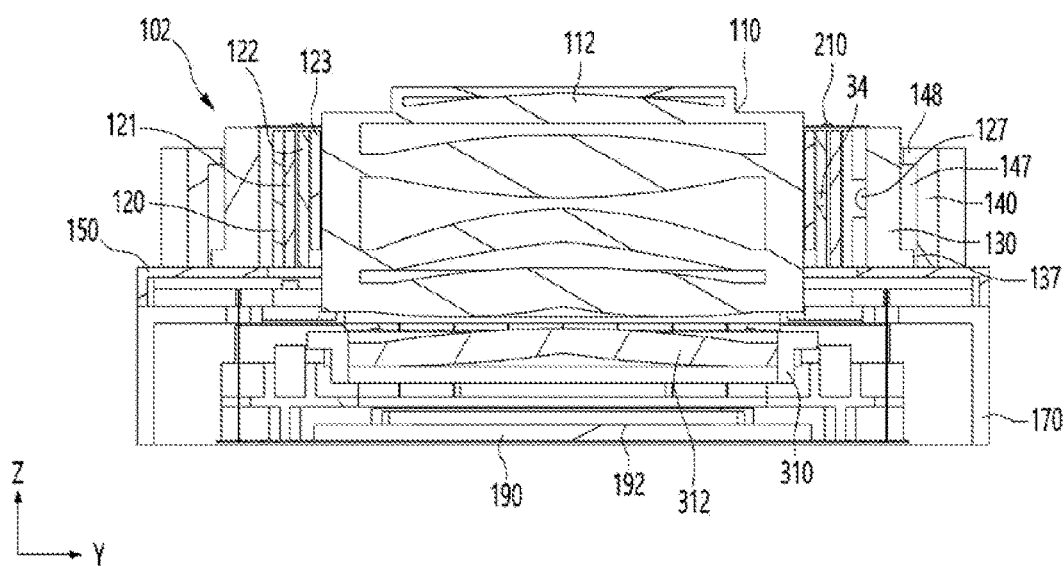
FIGS. 17 to 19 are side cross-sectional views of the camera module of FIG. 9, and are views illustrating coupling relationships of guide members for moving the first lens holder.

As shown in FIGS. 9 and 10, one end of the first elastic spring 210 may be connected to the upper portion of the first lens holder 110 and the other end may be connected to the first covers 130. The first elastic spring 210 may be implemented as a coil spring or a plate spring, and may include a buffer structure that is multi-staged or bent inside. The first elastic spring 210 provides and supports a predetermined elasticity when the first lens holder 110 moves up or down in the optical axis direction. Referring to FIGS. 8 and 17, when the first cover 130 moves in the optical axis direction (i.e., pop-up) of the first lens holder 110, the first cover 130 may move a predetermined distance or more, and may move in the optical axis direction along the outer surface of the guide member 102. The first cover 130 may be moved together with the first elastic spring 210, and a stop protrusion 137 of the outer lower portion thereof may be moved along the stop groove 147 of the second cover 140, the movement may be limited by the stopper 148 after moving a predetermined distance.

The second covers 140 may be moved in the optical axis direction from the outside of the first covers 130 when the first covers 130 is moved by a predetermined distance or more in the optical axis direction. At this time, in the second cover 140, the stop protrusion 149 disposed on the outer lower portion moves along the inner groove 159 of the support protrusion 155, and the movement may be restricted on the inner groove 159.

As shown in FIGS. 8 and 15 to 19, the guide member 102 may include a plurality of cylindrical portions 120, 121, 122, and 123. The guide member 102 may include a first cylindrical portion 120 on the outside, a second cylindrical portion 121 on an inside of the first cylindrical portion 120, a third cylindrical portion 123 on an inside of the second cylindrical portion 121, and a fourth cylindrical portion 124 on an inside of the third cylindrical portion 123. The first cylindrical portion 120 may be disposed between the first cover 130 and the second cylindrical portion 121. The second cylindrical portion 121 may be disposed between the first cylindrical portion 120 and the third cylindrical portion 122. The third cylindrical portion 122 may be disposed between the second cylindrical portion 121 and the fourth cylindrical portion 123. The fourth cylindrical portion 123 may be disposed between the third cylindrical portion 122 and the first lens holder 110.

As shown in FIGS. 15 and 16, the first cylindrical portion 120 has a plurality of rotation grooves 127 disposed around the outer circumference, and an end portion of the first driving member 220 may be coupled to each of the rotation grooves 127. Each of the rotation grooves 127 is formed concavely in the circumferential direction of the first cylindrical portion 120, and the end portion of the first driving member 220 may be inserted and coupled thereto. The first cylindrical portion 120 may rotate forward or reverse around the optical axis by the driving force of the first driving member 220. A plurality of first inclined grooves 125 are included in a region between the rotation grooves 127 of the first cylindrical portion 120, and each of the plurality of first inclined grooves 125 penetrates from the inside toward the outside and may extend obliquely from the upper end toward the lower end. A first protrusion 32 protruding from the lower outer periphery of the second cylindrical portion 121 may be inserted into the first inclined groove 125 of the first cylindrical portion 120. The first cylindrical portion 121 moves in the optical axis direction along the first inclined groove 125 and the first protrusion 32 by rotation of the first cylindrical portion 120. The plurality of first inclined grooves 125 may be disposed to face each other on opposite sides to each other. The plurality of first protrusions 32 may protrude in opposite directions from opposite sides to each other. A plurality of second inclined grooves 31 are formed in the second cylindrical portion 121 in a form penetrating from the inside toward the outside, and the second inclined grooves 31 may obliquely extend from the upper end toward the lower end. The third cylindrical portion 122 may have a plurality of second protrusions 33 protruding from the lower portion of the outer periphery. The plurality of second inclined grooves 31 face each other on opposite sides to each other, and may be respectively disposed in regions between the first inclined grooves 125. The plurality of second protrusions 33 correspond to the second inclined grooves 31 and may protrude in opposite directions from opposite sides to each other. The third cylindrical portion 122 may rotate and move in the optical axis direction when the second cylindrical portion 121 rotates and moves in the optical axis direction.

Figure 18:
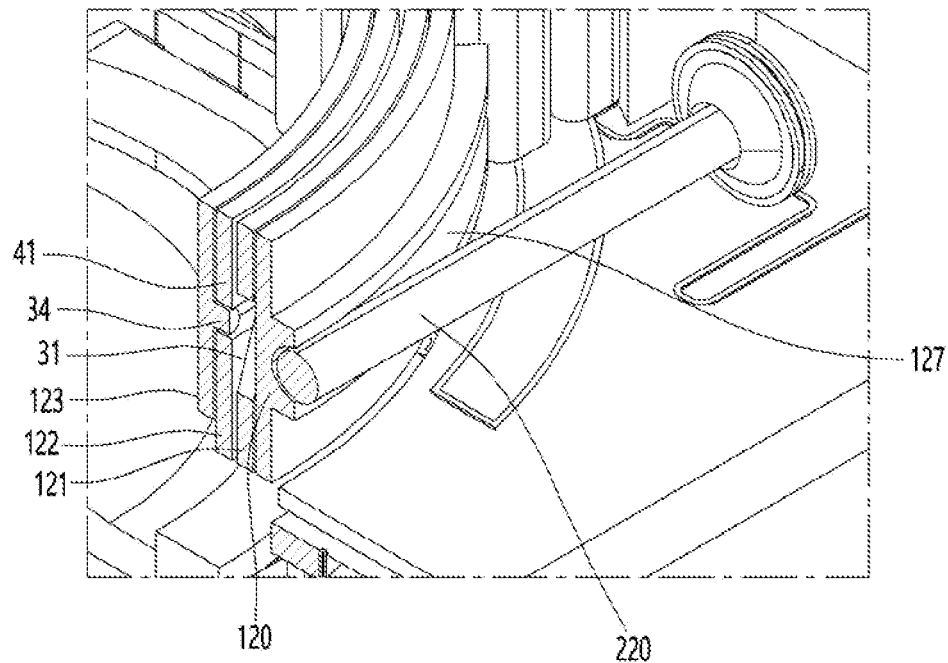
Figure 19:
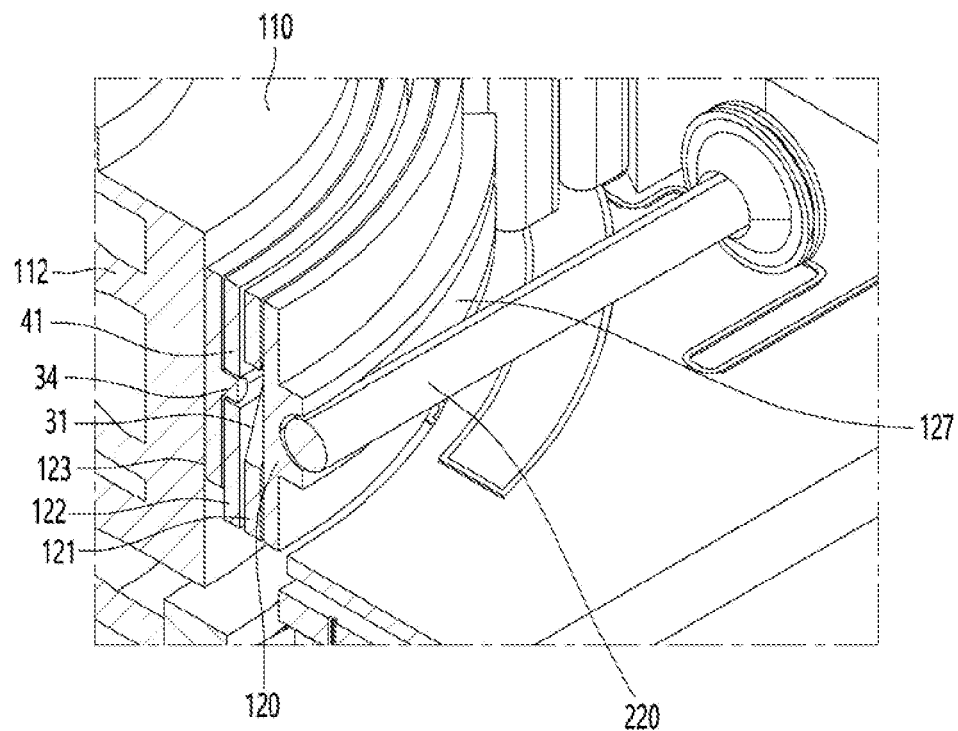

As shown in FIGS. 18 and 19, the third cylindrical portion 122 may include a plurality of circumferential grooves 34 penetrating in the circumferential direction at the center portion. The plurality of circumferential grooves 34 may be formed to have a length less than ½ of the circumferential length of the third cylindrical portion 122, for example, in a range of ⅓ to ⅕. The fourth cylindrical portion 123 may include a third protrusion 41 coupled to the circumferential groove 34 at an outer center portion. The third protrusion 41 may be inserted and coupled to the circumferential groove 34 of the third cylindrical portion 122. When the third cylindrical portion 122 rotates and moves in the optical axis direction, the third protrusion 41 is positioned in the circumferential groove 34 without being moved in the circumferential direction. Accordingly, the fourth cylindrical portion 123 does not rotate within the third cylindrical portion 122 and moves only in the optical axis direction. The fourth cylindrical portion 123 has a guide protrusion 51 coupled to the guide groove 115 outside the first lens holder 110, and the fourth cylindrical portion 123 moves in the optical axis direction, the guide protrusion 51 may move the first lens holder 110 up or down in the optical axis direction through the guide groove 115. In other words, when the first to third cylindrical portions 120, 121, and 122 are rotated and moved in the optical axis direction, the fourth cylindrical portion 123 moves only in the optical axis direction to move the first lens holder 110 in the optical axis direction.

As shown in FIGS. 8, 9 and 10, one end of the first elastic spring 210 is fixed on the guide protrusion 51 of the fourth cylindrical portion 123, and the other end may be coupled to an upper portion of the of the first cover 130. Accordingly, when the first lens holder 110 is moved up or down in the optical axis direction, the first elastic spring 210 supports and enables movement of the first lens holder 110 in the optical axis direction. When the first lens holder 110 move up in the optical axis direction, the first cover 130 moves in the up direction (i.e., the object direction) and the moving distance of the first elastic spring 210 may be increased. In addition, the second cover 140 may be moved when the first cover 130 is moved in the optical axis direction, thereby increasing the moving distance of the first elastic spring 210. Accordingly, the first lens holder 110 maximizes the moving distance in the up direction and may be stably supported.

The covers 130 and 140 and the guide member 102 are disposed on the middle bracket 150, and the middle bracket 150 may correspond to the first lens holder 110 through the through hole 62 therein. Here, a sub-spring 215 connected to the lower end of the first cover 130 and supporting the lower end of the first cover 130 may disposed on the middle bracket 150. The sub-springs 215 are disposed in plurality, and may be coupled to opposite sides of a portion to which the other end of the first elastic spring 210 is connected at the lower end of the first cover 130. The middle bracket 150 supports the support protrusion 155, and the support protrusion 155 supports and guides the outer sides of the covers 130 and 140.

The main substrate 160 is disposed on a lower portion of the middle bracket 150, the main substrate 160 has a through hole 62 therein, and may be disposed between the middle bracket 150 and the main case 170. The main substrate 160 may have a smaller size than the sizes of the middle bracket 150 and the main case 170 and may not be exposed to the outside. The main case 170 may accommodate the main substrate 160, the second lens holder 310, the moving bracket 180, and the substrate 190 therein, for example, the main substrate 160, the second lens holders 310, the moving bracket 180, and the substrate 190 may extend to a bottom through an inner side wall of the main case 170.

As shown in FIG. 8, the main substrate 160 may be spaced apart from the substrate 190 having the image sensor 192. The main substrate 160 and the substrate 190 may be supported and electrically connected by an interposer 185 and a suspension wire 182. The second lens holder 310 may be coupled between the main substrate 170 and the substrate 190. The second lens holder 310 may include at least one or a plurality of second lenses 312. The second lens 312 of the second lens holder 310 may be aligned with the first lens 112 of the first lens holder 110 in an optical axis direction. The first and second lenses 112 and 312 may be aligned with the image sensor 192 in an optical axis direction.

As shown in FIGS. 8 and 13, the moving bracket 180 may have a plurality of receiving grooves 81. A first driving portion 250 and a second driving portion 255 may be disposed between the moving bracket 180 and the main substrate 160. The first driving portion 250 and the second driving portion 255 may be defined as a second driving member. The second driving member may be disposed in plurality around the outer periphery of the second lens holder 310. The first driving portion 250 may include a plurality of first stators 252 and a plurality of first movers 254 opposite to the plurality of first movers 254. The first stator 252 includes a coil, and may be respectively disposed in the lower corner region of the main substrate 160. The first mover 254 is respectively inserted into and coupled to the receiving groove 81 of the moving bracket 180, and may include a magnet opposite to the first stator 252. The first driving portion 250 may include an actuator for OIS. The second driving portion 255 may include a second mover 256 and a plurality of second stators 258. The second mover 256 includes a coil and may be wound along an outer circumference of the second lens holder 310. The plurality of second stators 258 include magnets, face the second movers 256 and may be respectively disposed between the first movers 254. The second stator 258 may be coupled to the receiving groove 81 of the moving bracket 180, but is not limited thereto. The first mover 252 and the second stator 258 may be coupled to different regions in the plurality of receiving grooves 81 of the moving bracket 180, respectively. The second driving portion 255 may include an actuator for AF.

The moving bracket 180 may be moved in a direction perpendicular to the optical axis (horizontal direction) by the first driving portion 250, and at this time, the moving bracket 180 is moved by the horizontal movement of the moving bracket 180. The suspension wire 182 extending through is moved, and the substrate 190 may be moved in a horizontal direction by the movement of the suspension wire 182. That is, the substrate 190 of FIG. 11 may be moved to the same position as shown in FIG. 12, and accordingly, the image sensor 192 may be moved for the OIS function by the first driving portion 250.

When power is supplied to the second driver 255, electromagnetic force is generated by the second mover 256 disposed around the second lens holder 310 and the second stator 258 opposite thereto, thereby moved up or down the second lens holder 310 in the direction of the optical axis. That is, the position of the second lens holder 310 as shown in FIG. 14(a) may be moved up and moved to a position adjacent to the first lens holder 110 as shown in FIG. 14(b). Accordingly, the second lens holder 310 may be operated for AF by the second driving portion 255. The first and second driving portions 250 and 255 may be coupled to the moving bracket 180 and move together with the substrate 190 for OIS may control or move the second lens holder 310 in the direction of the optical axis. The second lens holder 310 may be used for AF and OIS, and since a coil is wound around the second lens holder 310 so that the weight of the second lens holder 310 may be reduced, and movement in the horizontal direction and the optical axis direction may be easier.

Here, as shown in FIG. 13, a plurality of second elastic springs 240 supporting the movement of the second lens holder 310 are included, and one end of each of the plurality of second elastic springs 240 may be connected to a moving bracket 180, and the other end may be connected to the second lens holder 310. The plurality of second elastic springs 240 may support movement and restoration of the position of the second lens holder 310. The first and second driving portions 250 and 255 may include hall sensors for positioning of the first and second stators 252 and 258. The hall sensor may provide position information so that the positions of the second lens holder 310 and the moving bracket 180 may be moved to the correct positions.

Figure 20:
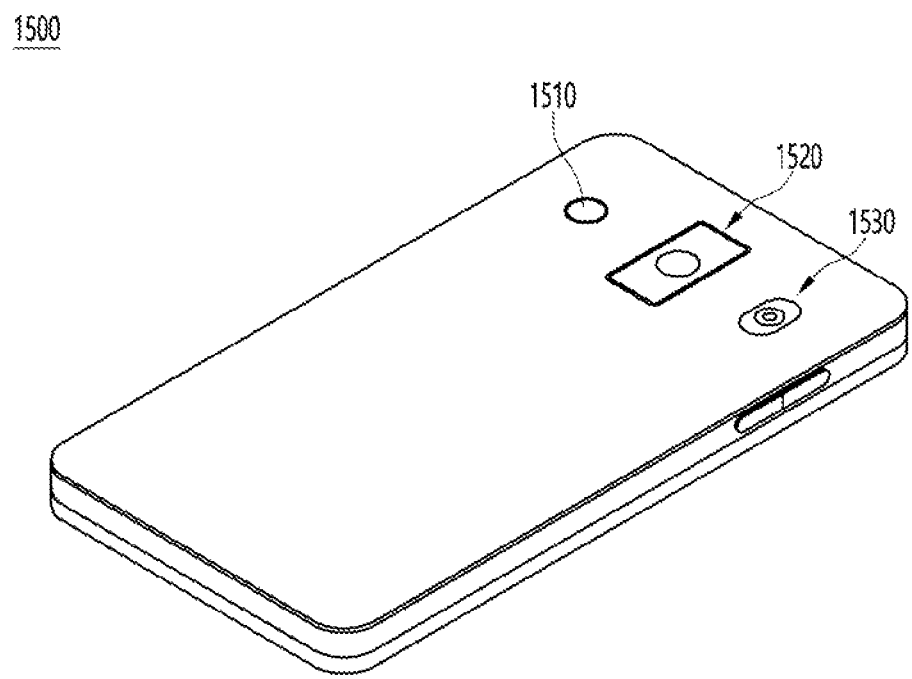
FIG. 20 is an example of a moving device having the camera module of FIG. 1 or 8.

FIG. 20 is a perspective view illustrating an example of a moving device to which a camera module according to an embodiment of the invention is applied. As shown in FIG. 20, a mobile terminal 1500 may include a camera module 1520, a flash module 1530, and an autofocus device 1510 provided on one side or rear side. Here, the auto focus device 1510 may include a surface emitting laser device and a light receiver as a light emitting layer. The flash module 1530 may include an emitter emitting light therein. The flash module 1530 may be operated by operating a camera of a mobile terminal or by a user's control. The camera module 1520 may include an image capturing function and an auto focus function. For example, the camera module 1520 may include an auto focus function using an image. The auto focus device 1510 may include an auto-focus function using a laser. The auto focus device 1510 may be mainly used in a condition in which an auto-focus function using an image of the camera module 1520 is degraded, for example, a proximity of 10 m or less or a dark environment.

The above detailed description should not be construed as limiting in all respects and should be considered illustrative. The scope of the embodiments should be determined by reasonable interpretation of the appended claims, and all changes within the equivalent range of the embodiments are included in the scope of the embodiments.

The invention claimed is:

1. A camera module comprising:
a substrate;
an image sensor on the substrate;
a lens holder having at least one lens on the image sensor;
a holder guide portion spaced apart from an outside of the lens holder and having a plurality of guide portions;
a plurality of first elastic springs having one end connected to the lens holder and the other end connected to the holder guide portion;
a plurality of second elastic springs connecting the plurality of guide portions of the holder guide portion to each other; and
a driving member disposed around the lens holder,
wherein one end of the first elastic springs is moved up or down together with the lens holder in an optical axis direction.

2. The camera module of claim 1, wherein the driving member includes a mover disposed on an outer side or lower surface of the lens holder and a stator disposed on the substrate.

3. The camera module of claim 1, wherein the driving member includes a mover disposed on at least one of an outer side and a lower surface of the lens holder, and a stator disposed inside the holder guide portion and facing the mover.

4. The camera module of claim 1, wherein the plurality of first elastic springs is three or four, and
wherein the plurality of second elastic springs is three or four.

5. The camera module of claim 1, wherein each of the second elastic springs has one end connected to a lower guide portion of the plurality of guide portions and the other end connected to an upper guide portion of the plurality of guide portions,
wherein when the lens holder is up or down in the optical axis direction, the upper guide portion is up or down with respect to the lower guide portion, and
wherein the second elastic springs is tensioned or restored when the upper guide portion moves.

6. The camera module of claim 1, wherein the holder guide portion includes a first guide portion stacked on a lower portion and a second guide portion stacked on an upper portion,
wherein the first and second guide portions are combined to each other by a plurality of grooves and a plurality of protrusions, and
wherein one end of the second elastic springs is connected to the first guide portion, and the other end is connected to the second guide portion.

7. The camera module of claim 1, wherein the holder guide portion has two or three guide portions that are combined in the optical axis direction or a horizontal direction.

8. The camera module of claim 1, wherein each of the plurality of guide portions has a cylindrical shape.

9. A moving device having a camera module according to claim 1.

10. A camera module comprising:
a substrate;
an image sensor on the substrate;
a first lens holder having a first lens on an object side;
a cylindrical guide member around the first lens holder;
covers disposed on both sides of an outer periphery of the guide member;
a first driving member having an end portion coupled to the guide member;
a second lens holder having a second lens between the image sensor and the first lens holder;
a second driving member on an outer periphery of the second lens holder; and
a plurality of first elastic springs having one end connected to an outside of the first lens holder and the other end connected to the covers,
wherein the image sensor and the first and second lenses are aligned in an optical axis direction, and
wherein the guide member is rotated by the first driving member to up or down the first lens holder in the optical axis direction.

11. The camera module of claim 10, comprising:
a main substrate disposed on a circumference between the first lens holder and the second lens holder;
a main case under the main substrate;
a moving bracket to which the second lens holder is coupled to an inside of the main case; and
a suspension wire connecting the main substrate and the substrate.

12. The camera module of claim 11, wherein the second driving member includes a first driving portion for moving the second lens holder and the substrate in a direction orthogonal to an optical axis.

13. The camera module of claim 12, wherein the first driving portion includes a first stator disposed under the main substrate and a first mover opposite to the first stator and fixed to the moving bracket,
wherein the first stator is a coil,
wherein the first mover is a magnet, and
wherein the moving bracket is moved in a direction perpendicular to the optical axis by the first driving portion.

14. The camera module of claim 12, wherein the second driving member includes a second driving portion,
wherein the second drive portion includes a second mover, which is a coil wound around the second lens holder, and a second stator facing the second mover and coupled to the moving bracket, and
wherein the second driving portion moves the second lens holder up or down in the optical axis direction.

15. The camera module of claim 10, wherein the guide member has a plurality of cylindrical portions,
wherein the plurality of cylindrical portions comprises:

a first cylindrical portion having a plurality of rotation grooves to which ends of the first driving member are coupled, and first inclined grooves respectively disposed between the plurality of rotation grooves;

a second cylindrical portion disposed between the first cylindrical portion and the first lens holder and having a plurality of first protrusions coupled to the first inclined grooves, and a plurality of second inclined grooves between the first protrusions;

a third cylindrical portion disposed between the second cylindrical portion and the first lens holder and having second protrusions coupled to the second inclined grooves, and a plurality of circumferential grooves penetrating in a circumferential direction; and a fourth cylindrical portion disposed between the third cylindrical portion and the first lens holder and including a third protrusion coupled to the circumferential grooves, wherein the fourth cylindrical portion moves the first lens holder in the optical axis direction by rotation of the first to third cylindrical portions.

16. The camera module of claim 15, wherein the fourth cylindrical portion includes a plurality of guide protrusions on an inner periphery, and the guide protrusions are coupled to the outer guide groove of the first lens holder and connected to one end of the first elastic springs.

17. The camera module of claim 15, wherein the covers comprise a first cover disposed on both sides of the outer periphery of the first cylindrical portion and connected to the other end of the first elastic springs; and a second cover disposed outside the first cover, and wherein at least one of the first and second covers moves in the optical axis direction along the first elastic springs and limits a movement of the first lens holder.

18. The camera module of claim 10, wherein the plurality of first elastic springs is three or four.

19. The camera module of claim 10, wherein the second driving member drives the second lens holder for AF and OIS.

20. A moving device having a camera module according to claim 10.

* * * * *